US008738322B1

(12) United States Patent
Gioffre, II et al.

(10) Patent No.: US 8,738,322 B1
(45) Date of Patent: May 27, 2014

(54) APPARATUS AND METHOD FOR A REMOTE FISH WEIGHING, MONITORING, AND CULLING SYSTEM (76) Inventors: Anthony Gioffre, II, Westerville, OH (US); Robert Lee Hayes, Galloway, OH (US); Vincent Ciamacco, Dublin, OH (US)

( * ) Notice: Subject to any disclaimer, the term of this patent is extended or adjusted under 35 U.S.C. 154(b) by 276 days.

(21) Appl. No.: 13/180,398

(22) Filed: Jul. 11, 2011

(51) Int. Cl.
*G01G 5/02* (2006.01)
(52) U.S. Cl.
USPC .......................................................... 702/173
(58) Field of Classification Search
USPC .......................................... 702/173; 177/207
See application file for complete search history.

(56) References Cited

U.S. PATENT DOCUMENTS

| | | | |
|---|---|---|---|
| 2,603,474 A | 8/1946 | Mandolf et al. | |
| 4,660,666 A | 4/1987 | Reder et al. | |
| 5,545,855 A * | 8/1996 | Stanfield et al. | 177/25.13 |
| 5,979,752 A | 11/1999 | Holloway | |
| 5,987,808 A | 11/1999 | Coles | |
| 6,671,994 B1 | 1/2004 | Klein | |
| 6,943,304 B1 * | 9/2005 | Brady et al. | 177/148 |
| 2009/0229168 A1 * | 9/2009 | Winkler | 43/55 |

* cited by examiner

*Primary Examiner* — Michael Nghiem
*Assistant Examiner* — Eman Alkafawi
(74) *Attorney, Agent, or Firm* — Vincent Ciamacco (57) ABSTRACT

An apparatus, method, and system comprising at least one transmission unit utilized as a weight measurement and transmission device in communication with a remote receiving and display unit and whereby the system allows for monitoring, tracking, and sorting of multiple weight measurements of fish as caught by a fisherman. The fish weight measurement data along with its associated fish identification data may be coded, sorted, and culled according to the lightest fish of the catch. The main components of the transmission unit include a transmitter, an actuator, a weight transducer, a control unit, and a signal processor. The main components of the receiving and display unit include a receiver, a display screen, and a signal processor.

20 Claims, 9 Drawing Sheets

APPARATUS AND METHOD FOR A REMOTE FISH WEIGHING, MONITORING, AND CULLING SYSTEM

TECHNICAL FIELD

Exemplary embodiments described herein relate generally to an apparatus and method for a remote weighing, monitoring, and culling system. More specifically, exemplary embodiments described herein relate to an apparatus and method for remotely weighing, transmitting, receiving, storing, displaying, and culling weight measurement data for fish or other like objects.

BACKGROUND OF THE INVENTION

Tournament fishermen face many challenges during the course of a fishing competition. The object of the competition is to catch and keep a pre-defined maximum number of fish of the highest weight in the live well. Once the maximum number of fish has been caught and placed in the live well, the fisherman must be able to quickly and efficiently decide whether a new fish just caught should be retained (to replace the lightest fish in the live well) or simply be released. In order to comply with the tournament rules, once the maximum number of fish are in the live well, the fisherman must be able to easily identify the lightest fish of the catch, and promptly release the lightest fish of the catch. The more time a competition fisherman needs to spend making weight determinations, the less time he will have with his lure in the water actually catching fish. Common techniques to determine the lightest fish such as "eyeballing" do very little to assist the tournament fisherman's need of speed and accuracy in identifying, and culling the lightest fish of the catch.

As such, there is a need in the art for an apparatus and method to assist a tournament fisherman to quickly and accurately determine which fish in the live well should be released once a larger fish has been caught and the maximum number of fish as defined by the tournament rules are in the live well.

SUMMARY OF THE GENERAL INVENTIVE CONCEPT

Exemplary embodiments of the inventive concept provide an apparatus and method for remotely weighing, monitoring, displaying, and culling fish weight measurement data.

More specifically, the present invention provides a fish weighing, transmitting and monitoring apparatus having at least one signaling device, e.g. a fishing transmission unit (or fish transmitter), capable of floatation and releasably securable to a fish, a scale releasably secured to the transmission unit for weighing the fish, and at least one transmitter for transmitting fish weight data along with its associated fish identification data to a remote unit for displaying the weight of the fish along with its associated identification data. The transmission unit (or transmitter) further includes an actuator, e.g. a push-button which operates to energize an electrical circuit of the transmission unit. The electrical circuit of the transmission unit further includes electrical components such as a control unit, a transducer, a signal processor, and a battery. The transmitter, when actuated, will transmit fish weight data along with its associated fish identification data for display at a remote unit. The remote unit includes a receiving unit, a display screen, and a signal processor for identifying, analyzing, sorting, and displaying fish data. In addition to sorting by weight, the remotely displayed fish data may further be processed by culling the lowest fish weight data when a maximum limit of monitored fish has been reached.

In further accordance with the present invention, a method and system for weighing and monitoring fish weight measurement data includes providing a signaling device releasably securable to a fish, utilizing a transmitter to energize an electrical circuit, weighing the fish utilizing a scale and transmitting fish weight and fish identification data to a remote unit, and displaying the data at the remote unit. The method and system further includes sorting the remotely displayed fish data by weight and also culling the lightest fish weight data along with its associated fish identification data.

BRIEF DESCRIPTION OF THE DRAWINGS

In addition to the features mentioned above, other aspects of the inventive concept will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

The present inventive concept will now be described more fully hereinafter with reference to the accompanying drawings, in which some, but not all possible embodiments of the invention are shown. Indeed, these inventions may be embodied in many different forms and should not be construed as limited to the embodiments set forth herein.

Figure 1:
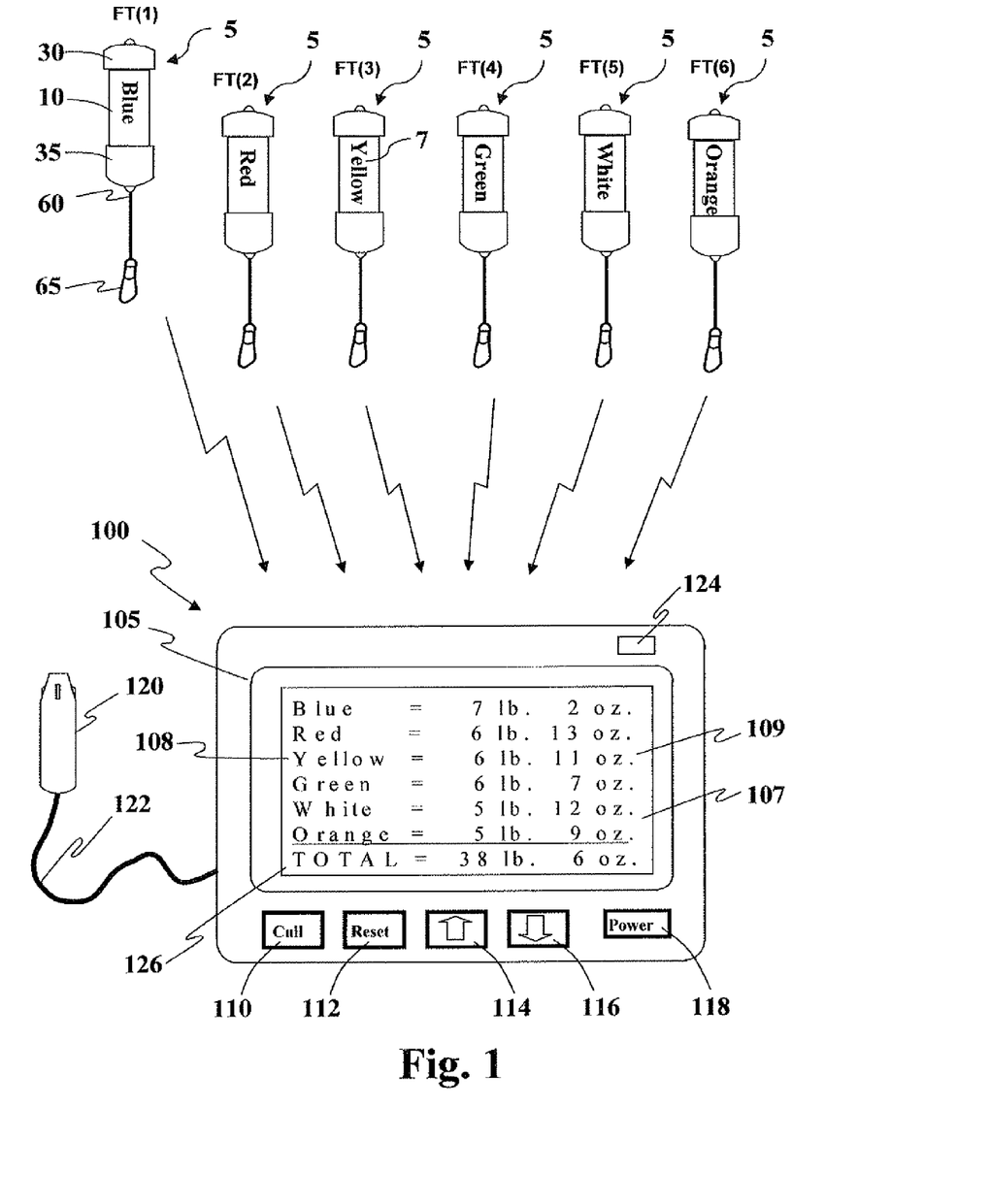
FIG. 1 is a plan view of a remote fish weighing, monitoring, and culling system of the present invention.

Referring now to the drawings, FIG. 1 shows a remote fish weighing and monitoring system that includes in this example six fishing transmission units (or transmitters) that are identified as FT(1), FT(2), FT(3), FT(4), FT(5), FT(6) and which in this example also includes six transmission (or transmitter) units 5 and a receiving and display unit 100. Each of the transmission units 5 shown include a battery powered RF (radio frequency) transmitter 89 (see FIG. 4) that transmits radio signals indicative of the weight of the fish on its associated fishing transmitter. RF transmitter 89 may be any widely available device found in the RF transmitter art, one such example is described in U.S. Pat. No. 6,667,684. The receiving and display unit 100 receives RF signals from transmission units 5 and displays the weight of the fish as transmitted from each of the six transmission units 5. The fishing transmitters FT(1)-FT(6) may be color coded as shown in FIG. 1 (numeral 7 indicates yellow) so as to correlate the fishing transmitter (i.e. FT(3)) with its corresponding display screen color 108 (i.e. yellow) and its associated fish weight 109.

Figure 2:
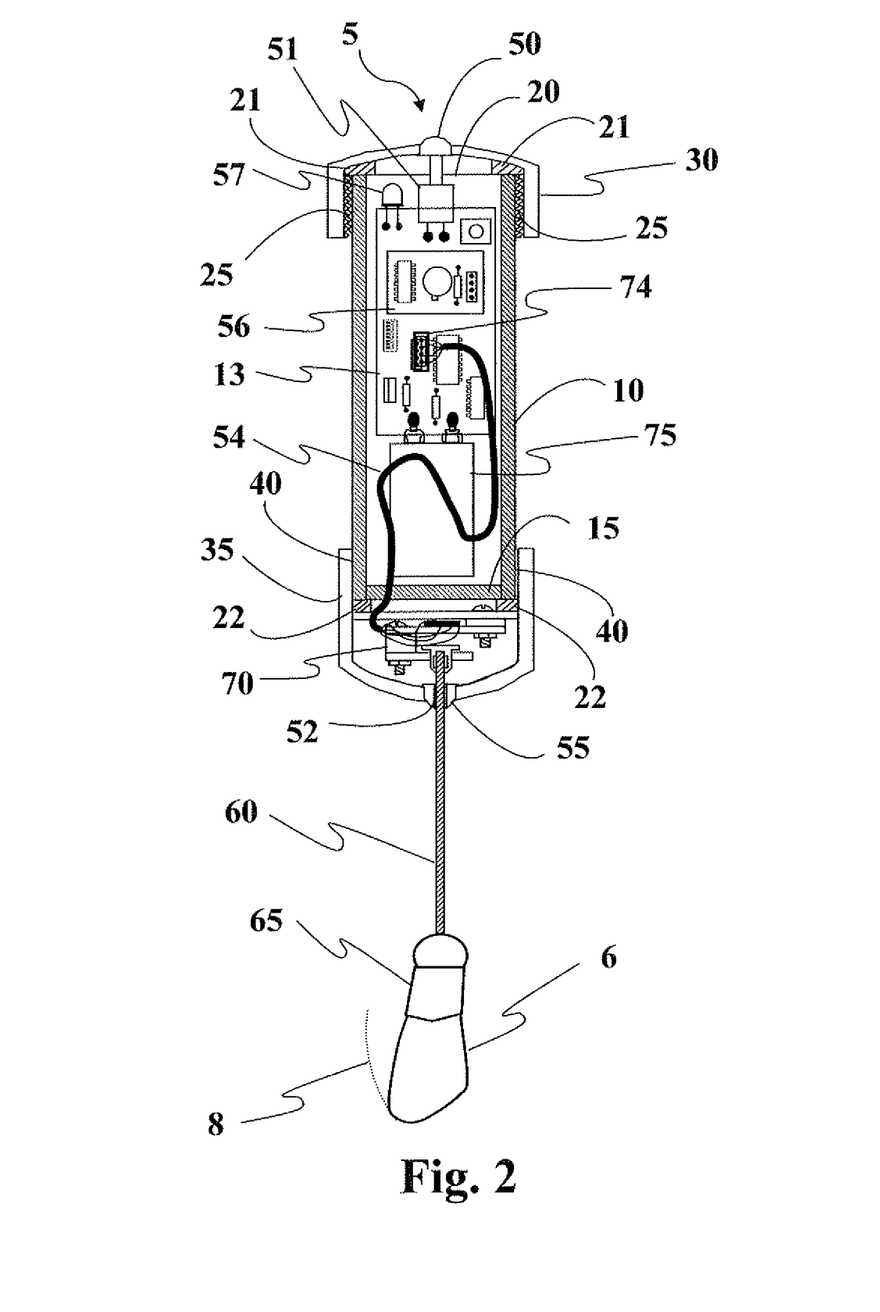
FIG. 2 is an enlarged view of the exemplary transmission unit of FIG. 1 with internal components exposed.
Figures 3, 3A:
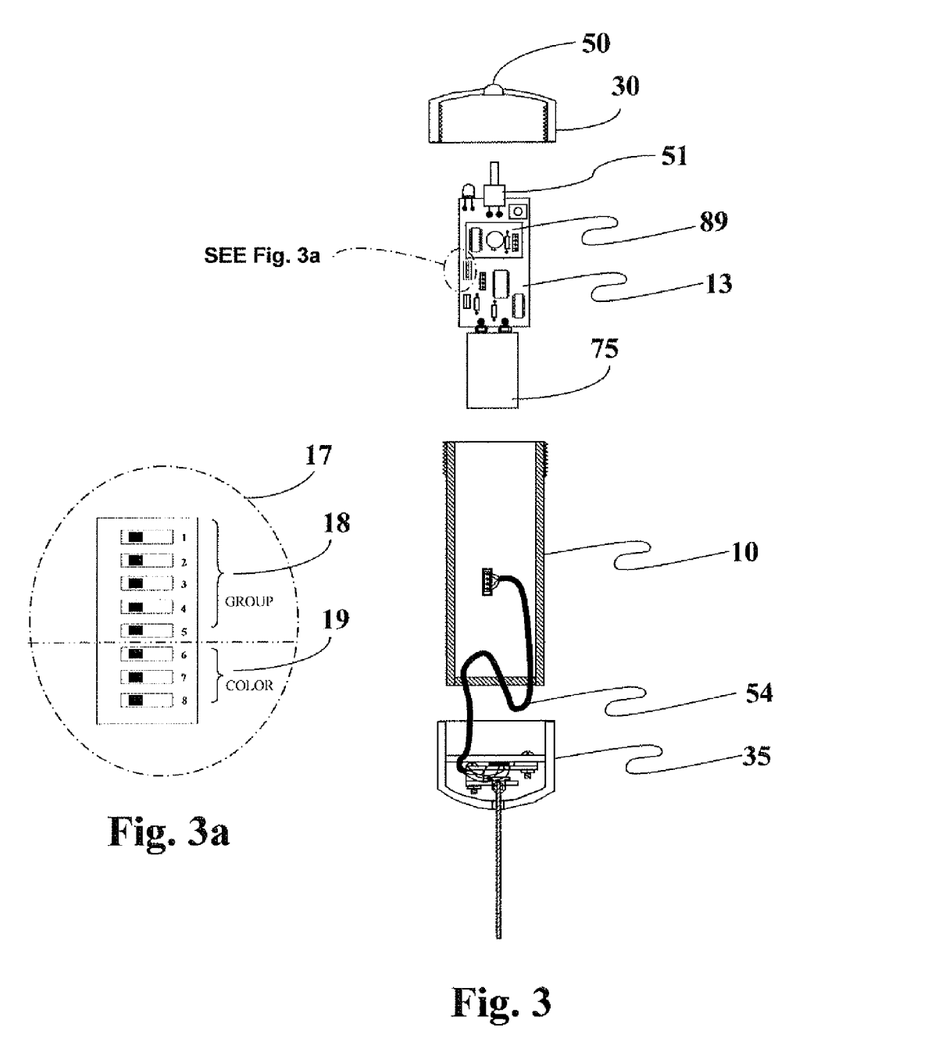
FIG. 3 shows a partially dis-assembled transmission unit of FIG. 2.
FIG. 3a is an enlarged view of an area within FIG. 3 specifically showing DIP (dual in-line package) switch details.

The at least one exemplary transmission unit 5 that may be utilized in the present invention is shown in FIGS. 1-3. Generally, a fish caught by the fisherman removed from his/her fishing line and the fish mouth is then hooked by hook 65. The operator then presses push-button cover 50 which in turn activates weight and transmit device 51 to thus weigh the fish and then transmit a signal which may be received by exemplary receiving and display unit 100. The fish along with its signaling device are then placed in the live well. The signaling device floats in the live well partially submerged while the fish is completely submerged in the live well. The transmission unit 5 includes a central body section 10 that may be formed of plastic or other suitable lightweight material capable of floatation and which includes a hollow chamber closed at its lower end 15 and which is open at its opposing upper end 20. Central body section 10 may be externally threaded around its upper circumference. A transparent cap 30 may contain internal threads within its open face to allow for it to be screwed onto central body 10 in mating engagement area 25. A lower cap 35 may engage central body 10 by being slip fit (see mating engagement area 40) onto the lower external circumference of central body 10 in conjunction with utilizing an adhesive to provide a water-tight connection. Alternatively, a threaded engagement may be utilized (as described above for the upper mating engagement area 25) if removability of the lower cap were desired. Since water-tight connections are needed for the transmitter 5 between upper cap 30, central body 10, and lower cap 35, the mating engagement areas at 25, 40 may be further supplemented with stoppers or heels 21, 22 (further structure incorporated into upper/lower caps) to provide further assurance of a water-tight connection. Upper cap 30, central body 10, and lower cap 35 should all be formed of plastic, or other suitable lightweight material to minimize weight of transmission unit 5 in order to assure floatation of the transmission unit 5.

Figure 2A:
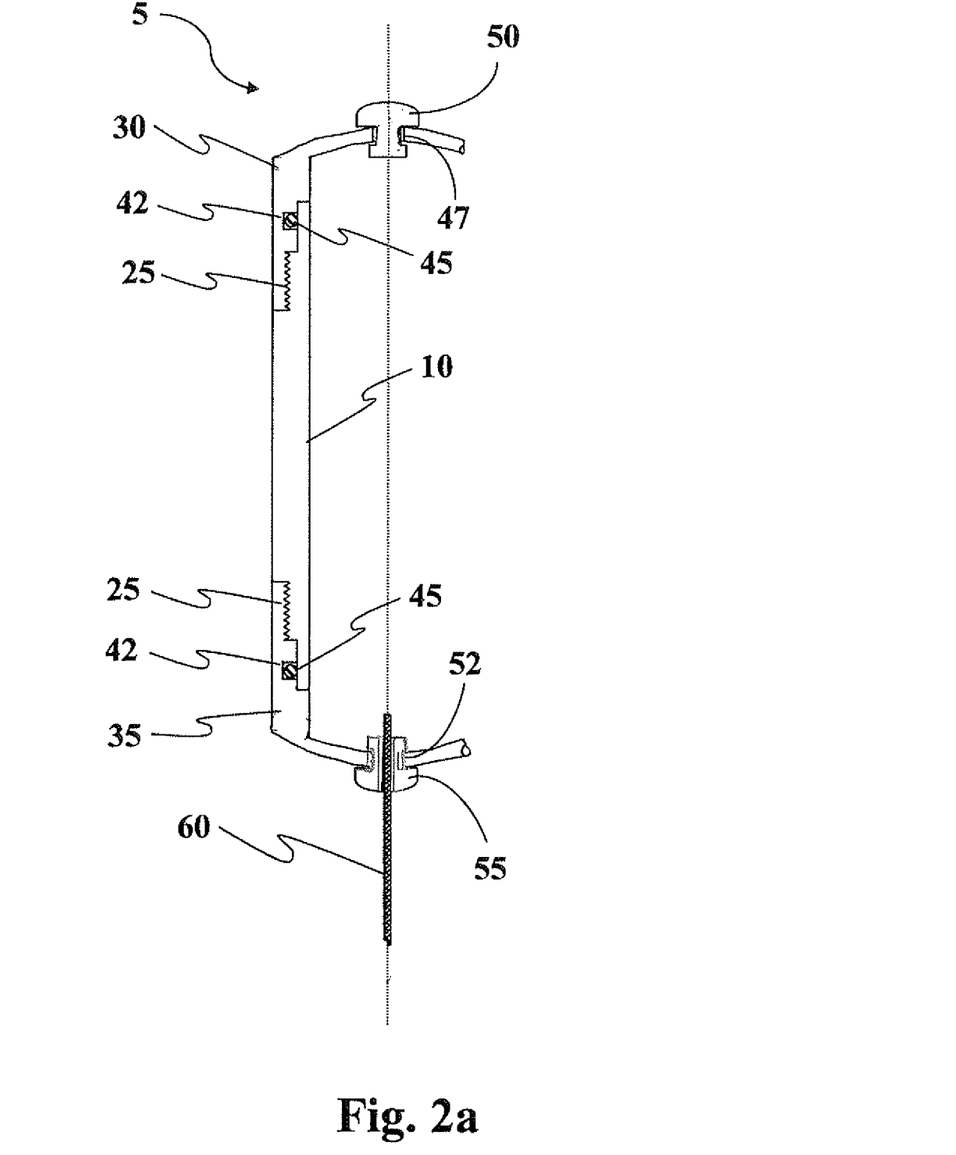
FIG. 2a is an enlarged view of the exemplary transmission unit of FIG. 2 specifically showing details of an alternate body construction arrangement.

Alternatively, a transmission unit 5 body construction as found, for example, in FIG. 2a includes a notch 42 which encases an a-ring seal 45 and which is in close proximity to threaded engagement area 25 to achieve a water-tight connection. This body construction technique could be duplicated in the lower portion of central body section 10 wherein notch 42 encases a-ring seal 45 which is in close proximity to mating engagement area 25. A water-tight flexible push-button cover 50 may be inserted into a centrally positioned aperture 47 on transparent upper cap 30 to maintain the water-tight arrangement. In addition, a sealing grommet 55 may be inserted into a centrally positioned aperture 52 on lower cap 35 to maintain the water-tight arrangement on the lower portion of transmitter 5.

A leader cable 60 passes through sealing grommet 55 and includes a hook 65 at its free end. For illustration purposes, hook 65 includes a spring wire portion 6 which is also shown in its open or biased position 8 (dashed lines). The leader cable 60 is adapted to be coupled with a weight measuring transducer 70 internally to the transmitter (see FIG. 2) at one end and which then extends downwardly through aperture 52 in lower cap 35. Weight measuring transducer 70 may be commonly found in the fish scale art, one such example is described in U.S. Pat. No. 5,545,855.

When a fish is caught by the operator and then removed from his/her fishing line, its mouth is then hooked into hook 65 (i.e. of one of the color fishing transmitters such as, for example, FT(1)). The transmitter FT(1) with a hooked fish is then lifted into the air, allowing the full weight of the fish to be suspended from hook 65 and leader cable 60. The leader cable 60 is connected to weight transducer (or load cell) 70 which converts the weight of the fish to a proportional output voltage. The proportional output voltage is transmitted by interface cable 54 and which terminates at plug connector 74. The electrical output of load cell 70 is connected to load cell amplifier 82 which conditions and amplifies the electrical voltage from load cell 70.

With the fish suspended from hook 65, the operator then presses (actuates) push button 50 which energizes the electrical circuit of the transmitter, (i.e. FT(1)). A positive voltage from battery 75 is then connected to voltage regulator 86 which conditions and regulates voltage for transmitter FT(1)'s electronic circuitry. The electronic components for transmitter FT(1), as an example, includes a signal processor 83, RF transmitter 89, load cell 70, load cell amplifier 82, and power latch circuit (or power latch) 87.

The receiver and display unit 100 consists of a display device 105 along with a number of individual function keys such as cull 110, reset 112, up-arrow key 114, down-arrow key 116, and a power on/off switch 118. Power may be supplied to the receiver and display unit 100 by plugging the connector 120 into a power outlet onboard the boat or other power supply device in the vicinity where the fish weight data needs to be displayed. A wire lead 122 electrically connects the connector 120 to the display unit 100. Alternatively, the receiver and display unit 100 may be hard wired directly into the boat (or other marine device) on-board electronics. An LED or lamp 124 flashes on display unit 100 when the transmission unit 5 signal transmission is complete.

Generally, when a fish (or other object being weighed) is attached to hook 65 and following the data transmission from transmission unit 5 to display unit 100, the fish weight is displayed on display screen 107 next to the lb. and oz. symbols 109 along with its associated identification color 108. The display screen 107 preferably also includes a TOTAL line 126 which represents the sum total of all weighed fish as a total weight value (i.e. 38 lb. 6 oz.).

Referring to FIGS. 1-4, when the display screen 107 is turned on by pressing power switch 118, pressing reset button 112 will clear all previous transmitter color codes 108 (i.e. blue, red, yellow, green, white, orange) and their associated weights 109. Only the TOTAL line 126 will be displayed along with its associated sum total weight (i.e. 0 lb. 0 oz.). When a fish is caught, the operator (or fisherman) hooks the fish on one of the hooks 65 and the transmission unit 5 is raised in the air allowing the full weight of the fish to be suspended on hook 65 and leader cable 60. The leader cable 60 is connected to weight measuring transducer 70 which converts the weight on hook 65 to a proportional electrical voltage. The electrical voltage from the transducer 70 is connected to control unit 13 by electrical cable 54. With the fish suspended on the hook 65, the operator then presses push-button cover 50 which in turn activates weight and transmit device 51 thus connecting power from the battery 75 to the transmitter's electronics (i.e. control unit 13 and RF transmitter 89). Battery 75, as an example, may be a common 9V battery. The control unit 13 measures the input voltage from the load cell 70 and converts the voltage value into a weight. At about the same time, and once the weight value has been calculated, the control unit 13 reads the pre-set configuration of the set of eight DIP switches 17 (FIG. 3a) as a binary code and in turn provides the group code 18 and transmitter color code 19 to receiver unit 100. For transmitter color code 19, DIP switches may be arranged in different combinations and each specific combination has a color assigned to it. The control unit 13 outputs the binary code along with its associated weight to the RF transmitter 89 which then transmits the information by way of its antenna 91. Once the transmission of group code 18, transmitter color code 19, and the converted weight value is complete, the controller 13 flashes the LED 57 a pre-determined number of times which can be seen through transparent cap 30 of transmitter 5. The battery power for control unit 13 and RF transmitter 89 may be automatically turned off once the transmission cycle is complete.

Figure 4:
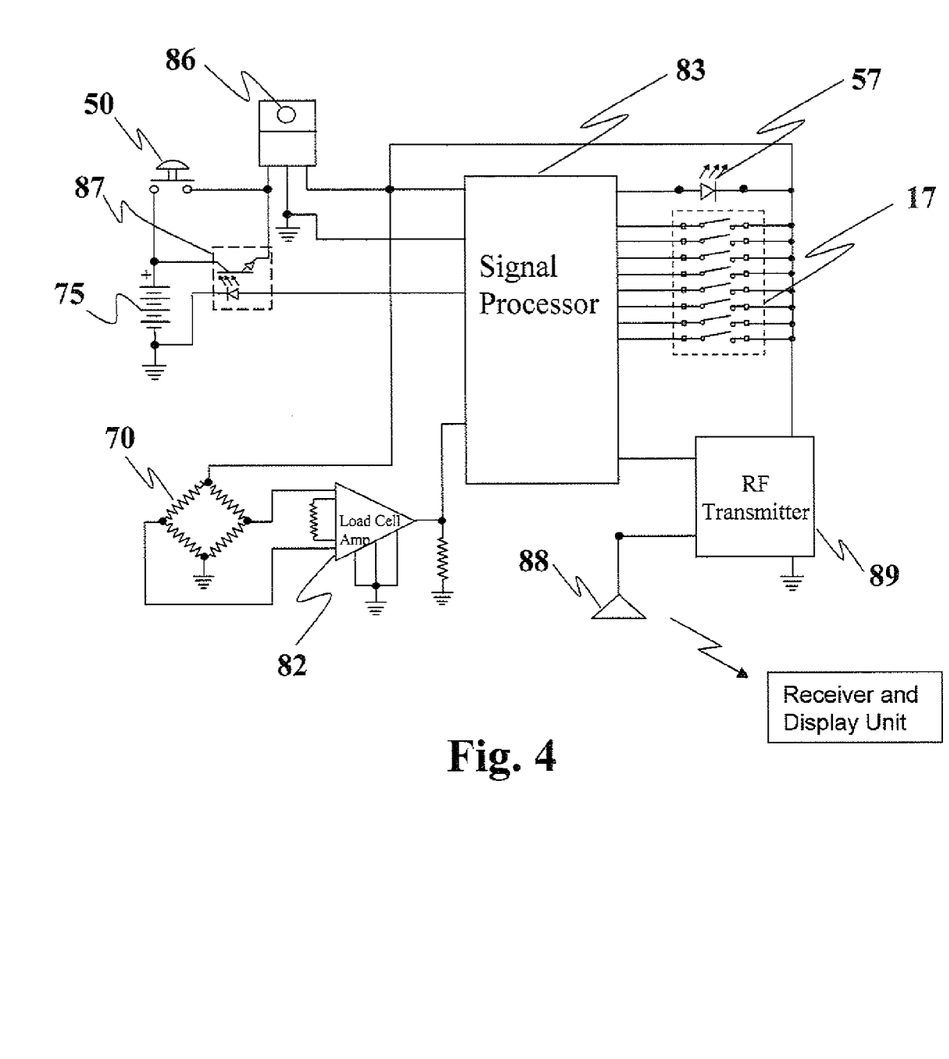
FIG. 4 is an exemplary wiring layout of the transmission unit of the present invention.

Referring to FIG. 4, each one of the designated DIP switches 17 (1-8) is connected to a dedicated input line of signal processor 83. The input lines are electrically pulled to a zero voltage or ground potential (i.e. low state) by signal processor 83. When one of the DIP switches 17 is set to its ON position, a positive regulated voltage is connected to its assigned input of signal processor 83, thus making the input line electrically positive (i.e. high state). The signal processor 83 interprets a high state as a binary one, and a low state as a binary zero.

Figure 6:
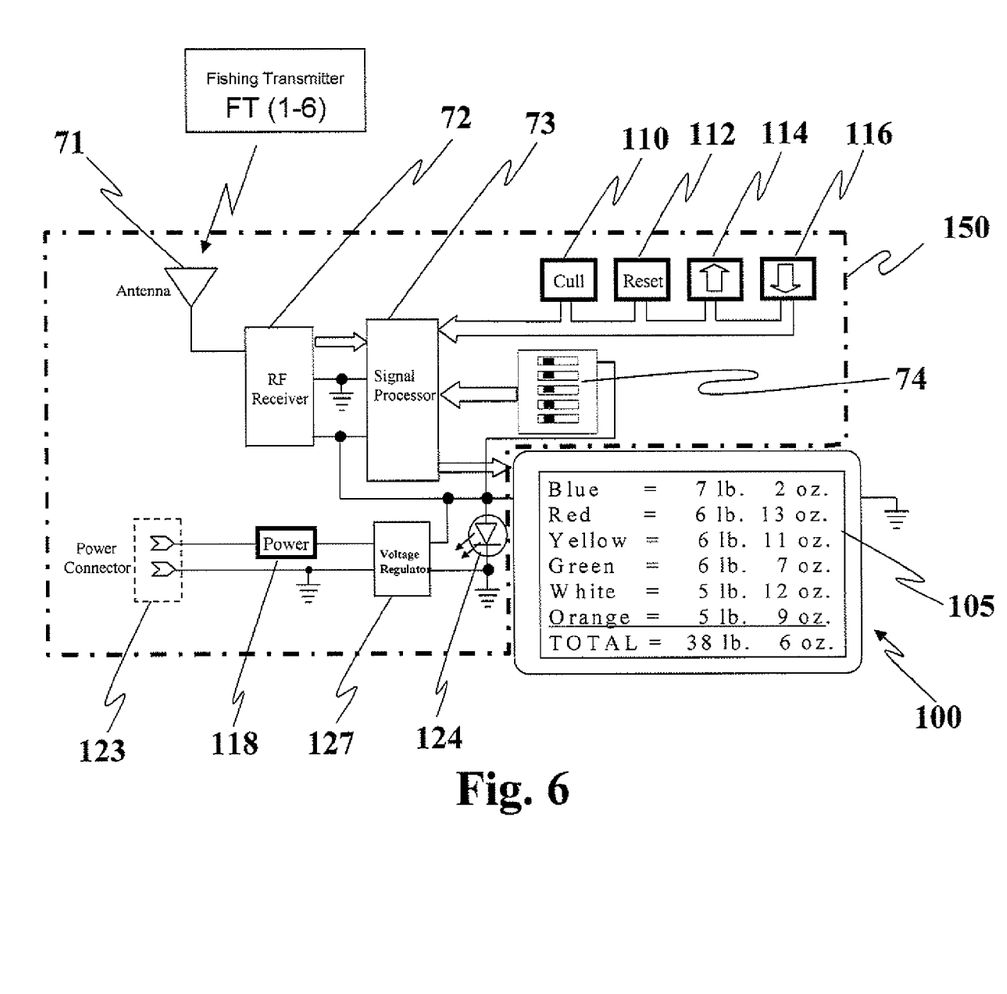
FIG. 6 is an exemplary layout of the receiving and display unit.

Referring now to FIG. 6, the receiver and display unit 100 receives the transmitter 5 transmitted data signal (i.e. group code, transmitter color code, and fish weight) by way of its antenna 71. The RF receiver 72 conditions the received signal and outputs it to one of the signal processor 73 inputs. RF receiver 72 converts transmitter 5 transmitted information to a pre-determined format (i.e. ASCII format) and then sends the data to signal processor 73. Signal processor 73 confirms that the group code 18 contained in the transmitted information matches the code that has been pre-set to the Group ID (Identification) DIP switches 74. If the Group ID 74 matches, the transmitter's color and its associated weight is processed by signal processor 73. The signal processor 73 configures the information into a pre-determined format and inputs the data to display device 105. Display screen 107 (see FIG. 1) displays each transmitter color 108 and its associated fish weight 109 in descending order by weight. For example, the largest weight is at the top of the screen, the second largest weight just below the largest weight, and so on. The TOTAL weight line 126 is always displayed at the bottom of display screen 107. If no transmitter 5 is displayed on screen 107, then the TOTAL weight line 126 would read 0 lb. 0 oz.

Figure 5:
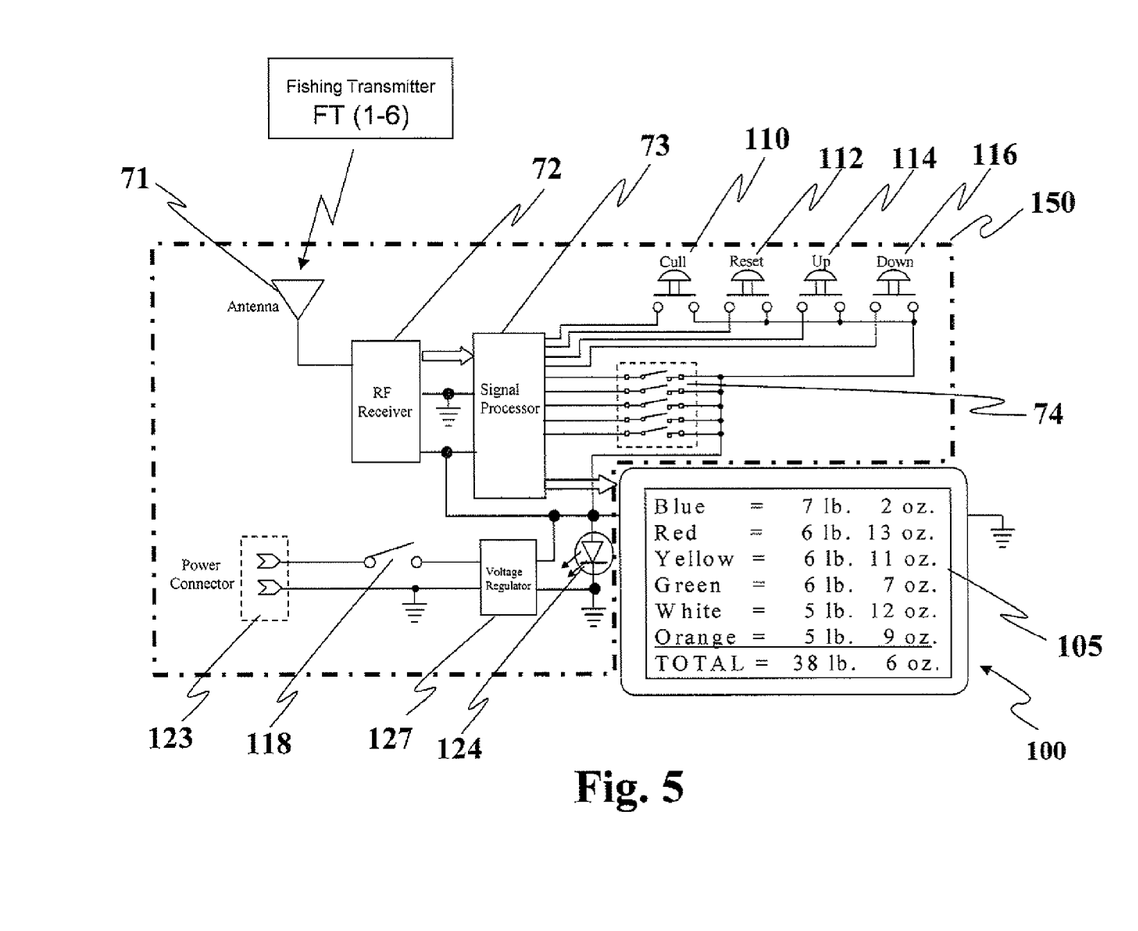
FIG. 5 is an exemplary wiring layout of the receiving and display unit of the present invention.

Referring now to FIG. 5, electrical components are shown schematically. Also, in both FIGS. 5 and 6, RF receiver and control units are generally depicted by numeral 150. The operator turns on the receiver and display unit 100 by depressing power button 118. Power connector 123 then makes an electrical connection with voltage regulator 127. The voltage regulator 127 provides regulated power for electrical components of the receiver and display unit 100, RF receiver 72, and signal processor 73. When the power LED 124 is on, an indicator (such as a light bulb) will illuminate on display unit 100. The power LED 124 is connected to the output of voltage regulator 127. The electrical components of transmitter 5 should also be constructed of lightweight materials so as to minimize the overall weight of the assembled transmitter 5.

When the power switch 118 is turned on, any previous information on display screen 107 will be retained and will be displayed once again. The display screen 107 may be cleared of previous transmission unit 5 information and the TOTAL line 126 weight value may be "zeroed" by pressing and holding reset button 112 for a specified time interval. When reset button 112 is pressed, positive regulated voltage is connected to a pre-assigned input of the signal processor 159 causing the input to change from a low state to a high logic level state. The low to high (state) voltage transition signals the signal processor 73 that the reset button 112 is being pressed. The signal processor 73 then monitors the length of time reset button 112 has been pressed, and if it exceeds a specified time interval, the display screen 107 will be cleared of all prior transmitter 5 weight information. Only the TOTAL line 126 will be displayed along with a zero weight value (i.e. =0 lbs. 0 ozs.) after the display unit 100 has been properly reset.

Referring now to FIG. 1, the operator may cull (or remove) a transmitter color and its associated weight by pressing the cull button 110. The up arrow button 114 and the down arrow button 116 are used to move the cursor from line to line on display screen 107. The cull button 110 is used to delete an entire line (i.e. transmitter color and weight). The reset button 112 clears the display screen 107, removes all stored screen data and "zeros" the TOTAL weight value.

Figure 8:
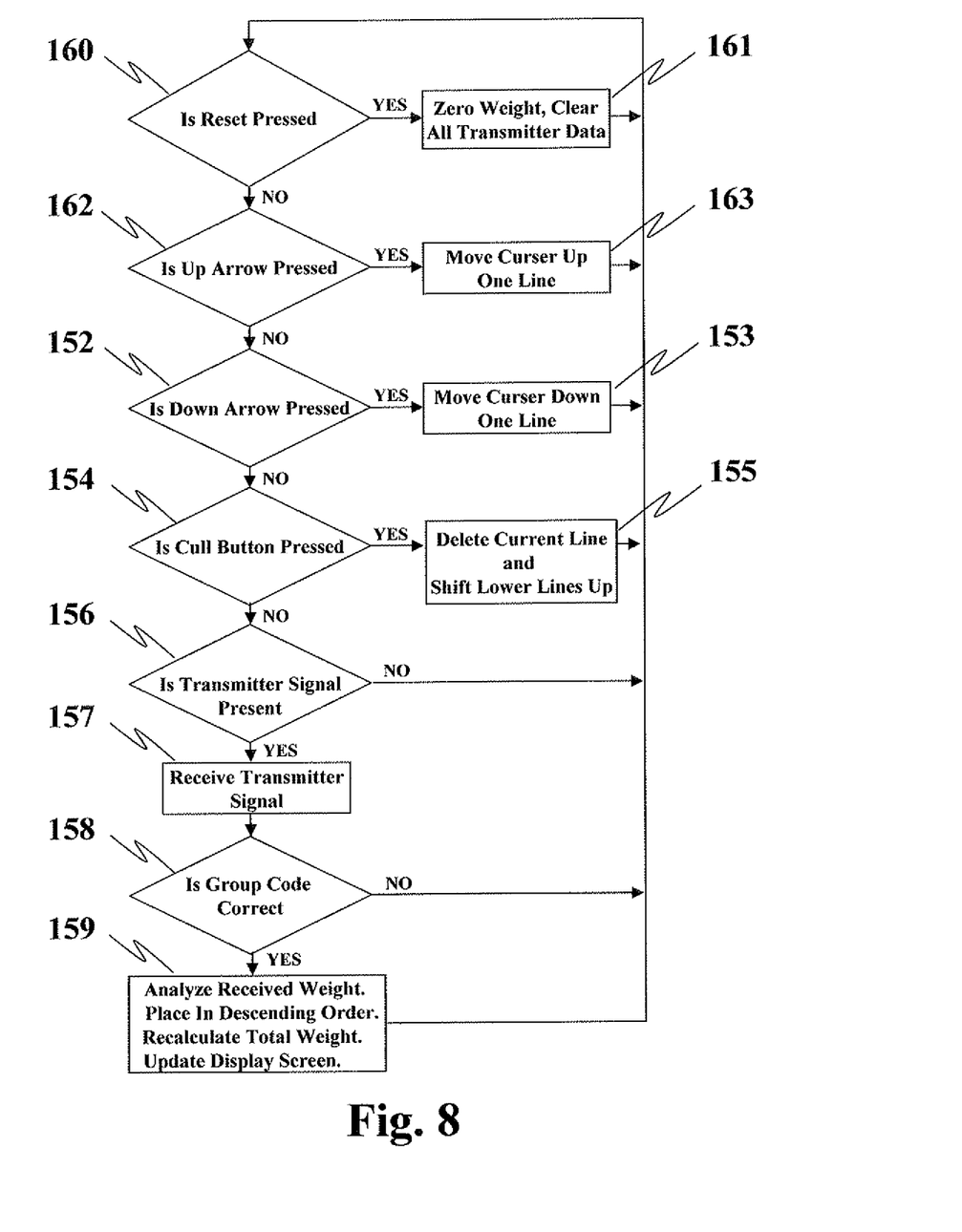
FIG. 8 is a flow diagram illustrating an exemplary operational sequence of the signal processor of the receiver and display unit of the present invention.

More specifically now, and referring to FIGS. 5, 6 and 8, each of the above described buttons (i.e. cull 110, up arrow 114, down arrow 116, and reset 112) are connected to a pre-determined input line of signal processor 73 and are normally electrically pulled to a low state (i.e. zero voltage or ground potential). When one of the buttons is pressed (i.e. cull 110, up arrow 114, down arrow 116, or reset 112), a positive regulated voltage is connected to its assigned input at signal processor 73 thus transitioning the input to a high state (electrically positive). A high state is interpreted as a "binary one" and a low state is interpreted as a "binary zero".

Figure 7:
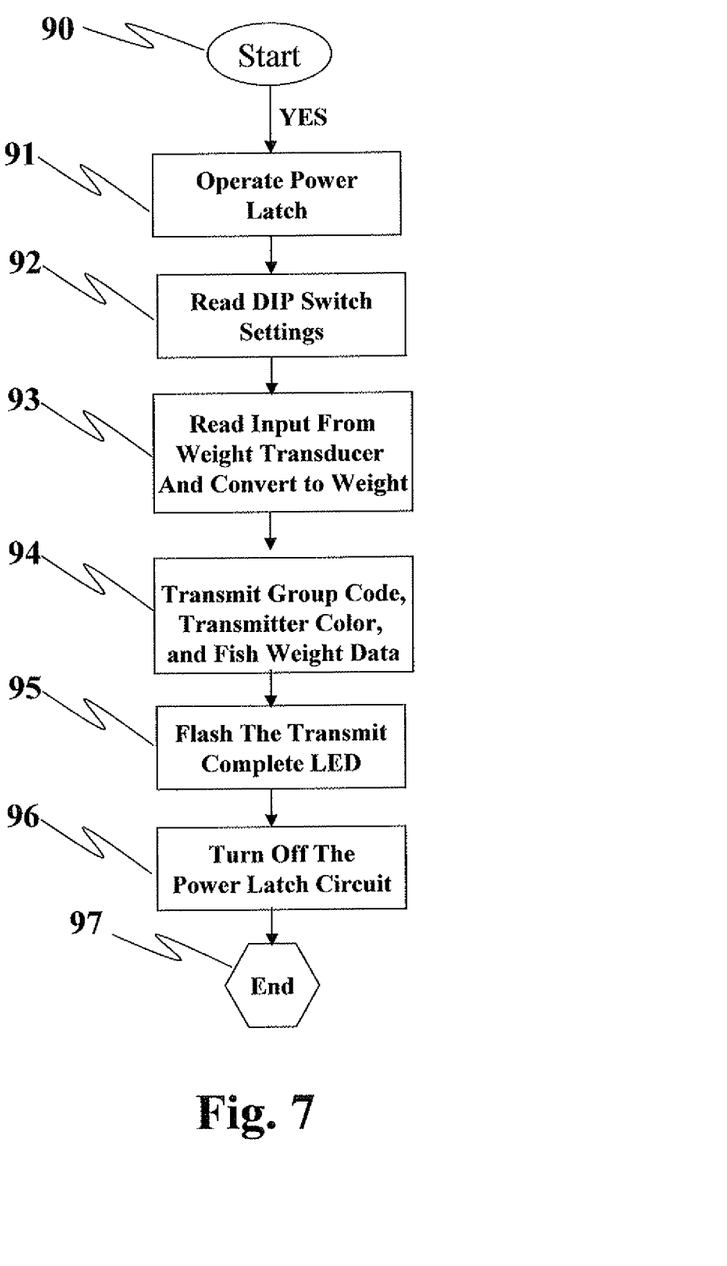
FIG. 7 is a flow chart illustrating an exemplary operational sequence of the signal processor of the transmission unit of the present invention.

FIG. 7 illustrates an exemplary method of operation for the instructional program of the transmitter's signal processor 83. The transmitter's operational instruction begins at step 90 when push-button 50 is pressed. At step 91, the signal processor 83 operates the power latch 87 (FIG. 4). As an example, the signal processor 83 outputs a positive voltage to power latch 87 which will then connect the positive voltage from battery 75 to the input of voltage regulator 86. When the push-button 50 is released, the power from battery 75 stays connected to voltage regulator 86, and can then be controlled by signal processor 83. At step 92, the signal processor 83 then reads the set of DIP switch settings 17 (FIG. 3*a*). For example, group code switches 18 (1-5) are used to assign one of thirty-two different combinations and which is set to the same code as the Group ID switches 74 (1-5) on receiver unit 150 (FIG. 5). Transmitter color switches 19 (6-8) of FIG. 3*a* provide for eight different possible combinations and are used to identify the color of the transmitter 5. Each color switch combination has a pre-determined color assigned to it.

At step 93, an electrical input voltage is read. The voltage was produced by the weight of the fish (suspended from hook 65) which causes a force to be exerted on weight transducer (or load cell) 70 and which produces an output voltage proportional to the weight of the fish. The output voltage from the load cell 70 is connected to the input of load cell amplifier 82 which conditions and amplifies the voltage from weight transducer 70. The output of the load cell amplifier 82 is connected to an analog to digital converter input (not shown) of the signal processor 83 where the voltage amplitude is converted to a weight value. At step 94, the accumulated data (i.e. group code, transmitter color, and weight) is converted to a pre-determined format and then sent to the signal processor 83 output which is connected to the input of RF transmitter 89. The RF transmitter 89 transmits the data by way of its antenna 88 to be received by receiver and display unit 100. At step 95, the transmit complete LED 57 flashes. The transmit complete LED 57 is connected to an output of signal processor 83 and can be seen visually by an operator through transparent cap 30. In addition, when transmission of the transmitter 5 data is complete and has been received by receiving and display unit 100, the LED 124 of the receiver and display unit 100 flashes. At step 96, once transmit complete LED 57 flashes on and off a pre-determined number of times, the power latch circuit 87 is turned off. With power latch 87 off, the power is disconnected from battery 75. All associated electronics such as load cell amplifier 82, voltage regulator 86, RF transmitter 89, and signal processor 83 will also turn off, thus completing the cycle at step 97.

FIG. 8 illustrates the operational sequence for the signal processor 73 of the receiver and display unit 100. At step 156, the signal processor 73 monitors the input from the RF receiver 72 and will receive a transmitter signal when present. At step 157, a transmitter signal has been received. At step 158, the transmitted group code data 18 from transmitter 5 is compared with the Group ID of receiver's DIP switches 74. If the group codes do not match, the transmitted data is ignored. If the group code data does match, then proceed to step 159. At step 159, the transmitted weight data is compared to all of the previously received weight data (i.e. data from the other colored transmitters) and the data is displayed on screen 107. The transmitter color and weight is displayed in descending order according to weight value (i.e. from highest weight at the top of the list to lowest weight at the bottom of the list). The total weight value is also re-calculated. The data is then sent to signal processor's 73 output which is connected to display screen 107. The display screen 107 receives the new data in the correct display format and displays the transmitter color with their associated weights in descending order (i.e. from highest to lowest as described above). The TOTAL weight line 126 now updated is also displayed.

More specifically, the operational program of FIG. 8 shows a step 160 where the status of the reset button 112 is confirmed. When the reset button 112 is pressed, the signal processor's 73 input that is connected to reset button 112 transitions from a low state to a high state. The signal processor 73 detects the low to high transition on the input (for a pre-defined time interval) and performs the reset function at step 161 which clears all current transmitter color and weight data being displayed, as well as "zeroing" the TOTAL weight value line 126. When the reset function 161 is complete and the reset button 112 is released, the assigned input line at the signal processor 73 returns to a low state and the operation program continues to step 162 where the status of the up arrow button 114 is confirmed. When up arrow button 114 is pressed, and the assigned input line to the signal processor 73 transitions from a low state to a high state, the cursor on display screen 107 is moved up one row at step 163. When the cursor is positioned at the upper most row and the up arrow button 114 is again pressed, the cursor will then move to the lower most row (i.e. row just above TOTAL weight value line 126). When the up arrow function at step 163 is complete and the up arrow button 114 is released, the assigned input line to signal processor 73 returns to a low state and the operation program continues to step 152 where the status of down arrow button 116 is confirmed. When down arrow button 116 is pressed, and the assigned input line to signal processor 73 transitions from a low state to a high state, the cursor on display screen 107 is moved down one row. When the cursor is positioned at the lower most row, and the down arrow button 116 is again pressed, the cursor will then move to the upper most row (i.e. the row at the top line of display screen 107). When the down arrow function at step 153 is complete and the down arrow button is released, the assigned input line to signal processor 73 returns to a low state and the program continues to step 154 where the status of the cull button 110 is confirmed. When the cull button 110 is pressed, and the assigned input line to signal processor 73 transitions from a low state to a high state, the row where the cursor is presently located will be deleted and any remaining rows below the deleted row will be shifted upward by one row (see step 155). When the cull function at step 155 is complete and the cull button 110 is released, the assigned input line to signal processor 73 returns to a low state and the program continues to step 156 where the transmitter signal status is continuously being monitored.

While certain embodiments of the invention are described in detail above, the scope of the invention is not considered limited by such disclosure, and modifications are possible without departing from the spirit of the invention as evidenced by the following claims:

What is claimed is:

1. A buoyant fish weighing and monitoring data transmitting device comprising: a substantially hollow and water-tight body including a central body section having an open upper end and a closed lower end, an upper cap forming a water-tight seal with the upper end of the body section, and a lower cap forming a water-tight seal with the lower end of the body section;
   a weighing transducer secured to the lower end of the body section and located within a space in the lower cap;
   at least one radio frequency transmitter located within the water-tight body, the at least one radio frequency transmitter in electrical communication with said weighing transducer;
   a hook assembly including a hook and a leader cable, said leader cable attached at one end to said hook and at an opposite end to said weighing transducer, said leader cable passing through said lower cap in a water-tight manner; and
   a power supply located within said water-tight body and in electrical communication with at least said weighing transducer and said at least one radio frequency transmitter;
   whereby upon suspending a fish from said hook, said weighing transducer is operative to provide an output signal representative of the weight of the fish and said at least one radio frequency transmitter is actuatable to transmit fish weight data received from said weighing transducer along with an associated fish identification data to a receiver; and
   wherein, said water-tight body is adapted to remain hooked to the fish after the fish is placed in a live well, where the water-tight body will be buoyantly suspended in the water located therein.

2. The device of claim 1, wherein at least a portion of said water-tight body is color coded, and said associated fish identification data transmitted by said at least one radio frequency transmitter will be similarly color coded.

3. The device of claim 1, further comprising an actuator, said actuator usable to activate said at least one radio frequency transmitter after said weighing transducer weighs a fish suspended from said hook.

4. The device of claim 3, wherein said actuator is a push-button.

5. The device of claim 1, further comprising a LED located within said water-tight body.

6. The device of claim 5, wherein said upper cap is transparent such that said LED is visible therethrough when illuminated.

7. The device of claim 1, further comprising a controller in communication with said weighing transducer and said radio frequency transmitter.

8. The device of claim 1, wherein said weighing transducer is a load cell.

9. The device of claim 1, further comprising a plurality of DIP switches located within said water-tight body, said DIP switches actuatable to assign a desired color code to said associated fish identification data transmitted by said at least one radio frequency transmitter.

10. The device of claim 1, further comprising a power button that electrically connects and disconnects said weighing transducer and said at least one transmitter to/from a flow of electrical energy from said power supply.

11. The device of claim 1, wherein said weighing transducer and said at least one radio frequency transmitter are always energized by said power supply.

12. A method of weighing and monitoring fish, said method comprising: providing a buoyant fish weighing and data transmitting device of claim 1;
   suspending a fish from the hook of said buoyant fish weighing and data transmitting device;
   weighing said fish with said weighing transducer of said buoyant fish weighing and data transmitting device;
   receiving at said at least one radio frequency transmitter of said buoyant fish weighing and data transmitting device, fish weight data from said weighing transducer;
   actuating said at least one radio frequency transmitter and transmitting said fish weight data, along with said associated fish identification data, to a receiver;
   receiving said transmitted fish weight data and said associated fish identification data at a said receiver; and
   displaying said fish weight data and said associated fish identification data on a display, associated with said receiver.

13. The method of claim 12, further comprising:
   providing a plurality of said buoyant fish weighing and data transmitting devices, each buoyant fish weighing and data transmitting device being identifiable;
   assigning each of said plurality of buoyant fish weighing and data transmitting devices to a different fish;
   weighing each fish using one of said plurality of said buoyant fish weighing and data transmitting devices;
   transmitting fish weight data and said associated fish identification data for each fish to said receiver using corresponding ones of said plurality of said buoyant fish weighing and data transmitting devices;
   after weighing and data transmission, placing each fish to be kept into a live well with said associated buoyant fish weighing and data transmitting device still hooked thereto;
   and using said plurality of said, buoyant fish weighing and data transmitting devices assigned to said fish in said live well to visually identify the individual fish.

14. The method of claim 13, further comprising:
   sorting said transmitted fish weight data displayed at said receiver from highest to lowest by weight.

15. The method of claim 14, whereby when a maximum number of fish weight data and associated fish identification data are displayed at said remote unit, subsequently culling the lowest fish weight data along with its associated fish identification data.

16. The method of claim 13, wherein said plurality of said buoyant fish weighing and data transmitting devices are each identifiable by means of dissimilar color coding, and wherein the data provided by a given buoyant fish weighing and data transmitting device is presented at said receiver with a color coding like that of the device.

17. A fish weighing and monitoring system comprising: a plurality of said buoyant fish weighing and data transmitting devices of claim 1, each buoyant fish weighing and data transmitting device being identifiable by means of dissimilar color coding;
   a remote unit for remotely receiving said fish weight data along with associated fish identification data from each of said buoyant fish weighing and data transmitting devices; and
   a screen in communication with said remote unit for displaying the fish weight data along with the associated fish identification data transmitted by each of said buoyant fish weighing and data transmitting devices.

18. The system of claim 17, further comprising: a plurality of DIP switches located on each of said buoyant fish weighing and data transmitting devices, said DIP switches actuatable to assign a desired color code to at least said fish identification data transmitted, by a given buoyant fish weighing and data transmitting device, said color code associated with said transmitted data being the same as the color code associated with the buoyant fish weighing and data transmitting device.

19. The system of claim 18, further, wherein said remote unit is adapted to setting automatically sort said transmitted fish weight data from highest to lowest by weight.

20. The system of claim 19, whereby when a maximum number of said fish weight data along with said associated fish identification data are displayed at said remote receiver, subsequently culling said remote unit is adapted to cull the smallest fish weight data along with its associated fish identification data.

* * * * *